United States Patent [19]

d'Agostino et al.

[11] Patent Number: 4,526,087
[45] Date of Patent: Jul. 2, 1985

[54] CONTROL MECHANISM FOR A TRIDIMENSIONAL CAM

[75] Inventors: Guy d'Agostino, Vitry; André Dhainaut, Dammarie les Lys; Claude M. J. Maillard, Vulaines sur Seine, all of France

[73] Assignee: S.N.E.C.M.A., Paris, France

[21] Appl. No.: 466,029

[22] Filed: Feb. 14, 1983

[30] Foreign Application Priority Data

Feb. 12, 1982 [FR] France .............................. 82 02289

[51] Int. Cl.³ ............................................. F01B 15/00
[52] U.S. Cl. ............................................ 91/61; 92/2; 92/117 A; 74/569
[58] Field of Search ..................... 91/1, 610, 197, 210, 91/216 R, 216 A, 382; 92/2, 5 R, 66, 120, 117 R, 117 A; 74/567, 569

[56] References Cited

U.S. PATENT DOCUMENTS

| 2,415,157 | 2/1947 | Bedford . |
| 2,757,046 | 7/1956 | Horiwe . |
| 2,783,942 | 3/1957 | Newell . |
| 2,893,210 | 6/1959 | Muszynski . |
| 2,942,496 | 6/1960 | Dietrich et al. . |
| 3,766,831 | 10/1973 | Yeakley . |
| 3,866,416 | 2/1975 | Lewis . |
| 4,398,682 | 8/1983 | Bithrey ................................. 91/61 |

FOREIGN PATENT DOCUMENTS

| 1326999 | 2/1960 | France . |
| 2418892 | 11/1977 | France . |
| 657131 | 2/1951 | United Kingdom . |
| 2054744 | 1/1981 | United Kingdom . |

OTHER PUBLICATIONS

Machine Design, vol. 21, No. 1, Apr. 1949 Cleveland (US) J. A. Hrones: "Key Factors In Cam Design and Application. Part I—Basic Relationships", pp. 127-132.
Praktische Getriebelehre vol. 2, 1939 Berlin (DE) Dr. Ing. Kurt Rauh: "Verstellbare Kurventriebe" pp. 59-61, 66.

Primary Examiner—Charles T. Jordan
Assistant Examiner—Richard Klein
Attorney, Agent, or Firm—Oblon, Fisher, Spivak, McClelland & Maier

[57] ABSTRACT

A cylinder (3) is positioned to rotate on a fixed axle (1) in such a way that several leakproof chambers (3B, 3D) are formed: a second, longer cylinder (4) is positioned to slide along the first (3) and to turn on the fixed axle (1) in such a way that several leakproof chambers are formed (4A, 4B). Communicating pressurized fluids into the various chambers makes the cylinders (3, 4) turn a distance proportionate to a value x, and can make the second cylinder move axially along the first cylinder a distance proportionate to another value y; these values x and y being derived from several variables and sensors (10a to 10d) "read" the surface contours of the second cylinder (4), representing, for example, a function f (x,y).

8 Claims, 4 Drawing Figures

CONTROL MECHANISM FOR A TRIDIMENSIONAL CAM

BACKGROUND OF THE INVENTION

1. Field of the Invention

The present invention involves a control mechanism for a tridimensional cam. A tridimensional cam receives two independent variables and provides one or more functions of these two variables. The device according to the invention can thus, for example, be used in a turbomachine regulating system.

2. Description of the Prior Art

The regulation of a turbojet requires a complex computer, one of the many capabilities of which is to calculate one or several functions of multiple variables. These can be various physical parameters, such as temperatures, flow rates, the operating speed of the turbine, etc.

There exist, of course, various types of computers capable of calculating functions of multiple variables, notably a purely electronic computer. These present the disadvantage of accepting only input values of an electrical nature, whereas the control mechanism according to the present invention accepts input values (the variables) of a fluid nature (hydraulic or pneumatic) while the output value (the function) is a translation movement which is easily convertible into a value of another given physical nature.

The control mechanism of a tridimensional cam according to the present invention is characterized by the fact that the tridimensional cam is made of a single piece with a contoured but essentially cylindrical surface and a cylindrical bore, and that this cam is displaced relative to at least one sensor by means of a composite jack which produces independent movements of the cam both around the rotational axis of the system for one of the values, in translation in the direction of this axis for the second value.

U.S. Pat. No. 2,893,210, applied for on June 17, 1958, describes the combination, in the same fixed cylinder, of a piston transmitting rectilinear movements to a rod, with a sort of rotary jack having two chambers wherein filling one or the other of these chambers with a pressurized fluid causes the rotation of a sleeve which is immobilized relative to translational movement of the aforesaid rod, but which rotates as one piece with the rod.

This existing mechanism, which has a linear-action jack combined with a rotary jack, could be used as a basis for implementing the present invention, by mounting the tridimensional cam (i.e. specifically the cylindrical part onto which the cam is mounted or tooled) on the end of the rod of the composite jack which projects from the jack housing. The resulting version, which might be useful in certain applications, would, however, be insufficiently compact in the regulator of a turbojet, since the cam and its sensor would have to be mounted on the extension of the fixed cylinder of the composite jack.

SUMMARY OF THE INVENTION

In a preferred version of the mechanism according to the present invention, which also has a linear-action jack combined with a rotary jack, there is a fixed axle on which there is at least one radial flange, a rotary-jack cylinder mounted so as to turn freely on the fixed axle and its flange, at least two leakproof chambers, each of which has two radial partitions, one formed by the fixed flange and the other being part of the rotating cylinder, and a linear-action jack cylinder which is longer than the rotating cylinder and which is mounted so as to slide freely on the rotating jack while turning freely on the fixed axle in order to form at least one leakproof chamber with them. The cylindrical cam is tooled or mounted on the exterior cylindrical surface of the linear-action jack, and means are supplied to independently and selectively fill the chambers of both the rotary jack and the linear-action jack with a pressurized fluid.

This version of the invention has particular advantages especially since the tridimensional cam and the corresponding sensor are placed exactly on the level of the composite jack, particularly that of the linear-action jack, which considerably reduces the size of the resulting mechanism as compared with that of the mechanism using the composite jack according to U.S. Pat. No. 2,893,210 cited above.

The control mechanism of a tridimensional cam according to the present invention is adapted to many applications, even outside the computer field, as shall be explained below.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

DETAILED DESCRIPTION OF THE PREFERRED EMBODIMENTS

Figure 1:
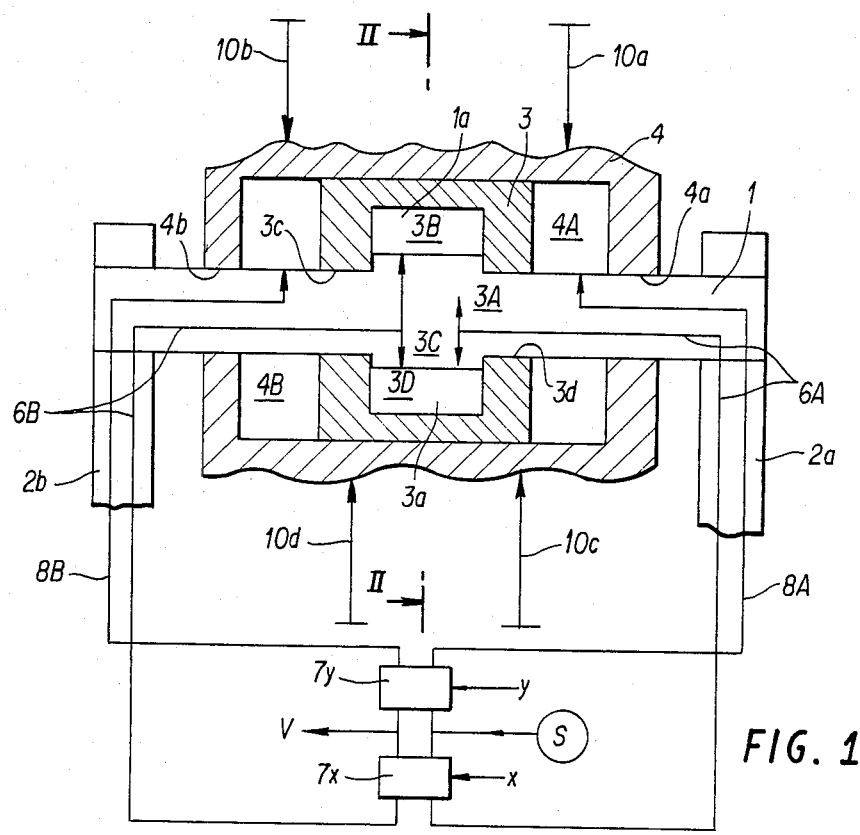
FIG. 1 is a theoretical diagram in which a preferred embodiment has been depicted in cross-section along the axial plane, taken along line I—I of FIG. 2.
Figure 2:
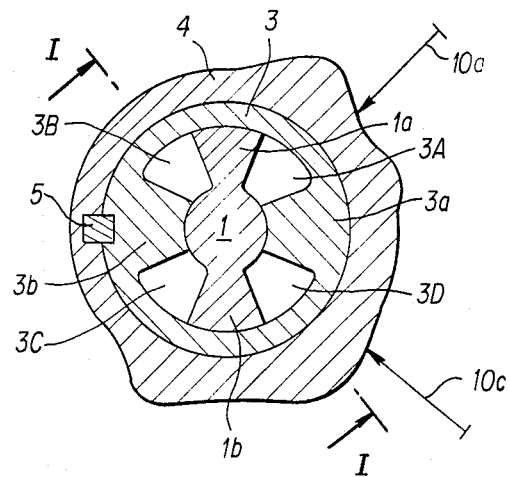
FIG. 2 is a cross-section view taken along line II—II of FIG. 1.

In the theoretical diagram of FIGS. 1 and 2, reference number 1 designates a fixed axle, opposite ends of which are fixed, respectively, in supports 2a and 2b. The fixed axle has two external radial flanges, 1a and 1b, diametrically opposed to each other. Reference number 3 designates a rotary jack cylinder which is mounted to turn freely on fixed axle 1 and its flanges, 1a and 1b, and which also has two internal radial flanges, 3a and 3b, diametrically opposed to each other and cooperating with fixed axle 1, between flanges 1a and 1b, so as to form four leakproof chambers 3A to 3D (FIG. 2). The leakproofness of these four chambers is assured by sealing means, which need not be described in detail, at the contact surfaces of the external flanges 1a and 1b of fixed axle 1 and the internal cylindrical surface of rotary jack 3; contact surfaces between internal flanges 3a and 3b of the aforementioned rotary jack 3 and fixed axle 1, between its flanges 1a and 1b; contact surfaces between axle 1 and boreholes 3c and 3d, tooled into the two end walls of rotary jack 3; and contact surfaces between the internal faces of the end walls of rotary jack 3 and the ends corresponding to flanges 1a and 1b of axle 1. These existing hermetic sealing means are chosen, obviously, in such a way as to permit free rotation of rotary jack 3 around axle 1 and its flanges 1a and 1b. Reference number 4 designates a linear-action jack cylinder, which is longer than rotating jack 3, and which is mounted to slide freely on rotary jack cylinder 3 and to turn freely on fixed axle 1, so as to form therebetween two leakproof chambers 4A and 4B. The leakproofness of these two chambers is assured by existing means, chosen so as to permit free rotation of cylinder 4 on fixed axle 1, at boreholes 4a and 4b, which are located in its end walls while reference number 5 designates a catch-pin which rotationally immobilizes cylinder 4 relative to jack 3 while permitting such to slide freely against jack 3.

Each pair of chambers 3A–3C and 3B–3D is linked by a conduit 6A or 6B to two points of access into a hydraulic servo-control 7x, of which two other access points are linked respectively to a source of pressurized hydraulic liquids and to a drain conduit V. The servo-control 7x has, as well, an opening to receive the first variable x, which can be introduced in an appropriate but essentially arbitrary physical form (mechanical displacement, fluid pressure, electrical input, etc.). As seen in FIG. 1, each of the conduits 6A and 6B cross, respectively, fixed axle 1 in directions basically axial, and the supports 2a and 2b. Similarly, conduits 8A and 8B link, respectively, chambers 4A and 4B to two access points of a servo-control 7y, which has two other openings also connected to source S and to the drain conduit V and which has an input y applied in an appropriate but largely arbitrary physical form.

In the embodiment illustrated, the lateral surface of cylinder 4 of the linear-action jack has been machine tooled, or has been cast with tridimensional contours which together constitute a tridimensional cam wherein the surface contours of this cam can be detected by sensors such as 10a and 10b.

The mechanism according to the present invention, which has just been described, works as follows.

Supposing for example that the respective initial positions of rotary jack 3 and of linear-action jack 4 are such that chambers 3A, 3C, and 4A have essentially no volume, or at least minimal volume. Conventionally these initial positions of the two jacks can correspond to fixed but arbitrary values of variables x and y, for example, their 0 value. If, for example, variable x increases from its initial value, servo-control 7x establishes direct links, on the one hand, between the source of pressurized hydraulic fluid S and conduit 6A, and, on the other and, between conduit 6B and drain conduit V; the pressurized hydraulic fluid that reaches chambers 3A and 3C through conduit 6A exercises driving torque in the same direction (clockwise in FIG. 2) on the internal flanges 3a and 3b of the rotary jack cylinder 3, which is thereby caused to rotate around fixed axle 1 until, for example, variable x ceases to increase; the initial volumes of the two chambers 3A and 3C are thus increased, beginning at their respective minimal values, up to final values, respectively proportional to the increase in variable x, while, simultaneously, the volumes of chambers 3B and 3D, which initially were maximal, have each been reduced in the same proportion. A corresponding fraction of the hydraulic liquid in chambers 3B and 3D is forced back through conduit 6B and servo-control 7x towards drain conduit V.

If, starting from the value reached previously, variable x decreases, servo-control 7x immediately connects chambers 3A and 3C with drain V and chambers 3B and 3D with hydraulic liquid source S, so that rotary jack cylinder 3 turns in the opposite direction until variable x ceases to decrease. When the second variable y increases over its initial value, servo-control 7y links, on the one hand, chamber 4A through conduit 8A to pressurized hydraulic liquid source S and, on the other hand, chamber 4B through conduit 8B to drain V. The pressurized hydraulic liquid introduced into chamber 4A exercises a resulting axial force on its internal right wall (on FIG. 1) which has the effect of making linear-action jack cylinder 4 slide relative to rotary jack 3 and axle 1, also toward the right in FIG. 1. The result is a decrease in the volume of chamber 4B compared to its initial value, which was maximal. Part of the hydraulic liquid contained in chamber 4B is forced back through conduit 8B towards drain V. When variable y ceases to increase, jack 4 is immobilized at a distance from its initial position which is essentially proportional to the increase in variable y; if variable y decreases, jack 4 moves to the left in FIG. 1. In addition, linear-action jack 4 has been set in rotation by rotary jack 3, and it is obvious that each sensor such as 10a, which is fixed relative to axle 1, will pick up at any given moment cylindrical coordinates relative to the tridimensional cam, which are respectively proportional to the momentary values of variables x (for the peripheral coordinate) and y (for the axial coordinate). If the tridimensional cam carried on the lateral surface of jack 4 has been proportioned so that its radial dimension, z, is a determined mathematical function f (x, y) of variables x, y, we see that the value detected by fixed sensor 10a, which varies linearly with radial coordinate z, is effectively proportional to the value of function f (x, y) for the momentary values of variables x, y applied to the corresponding input values of servo-controls 7x and 7y.

Figure 3:
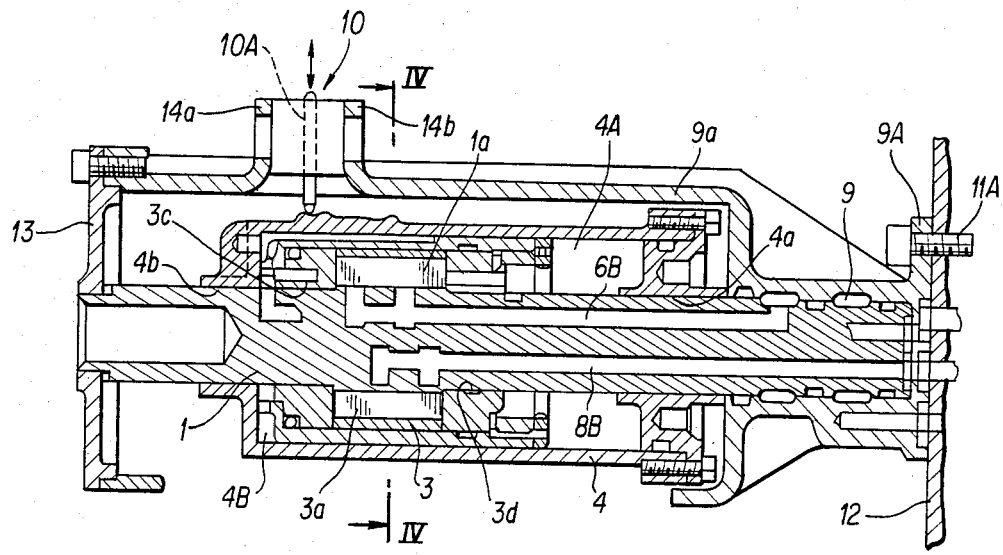
FIG. 3 is a detailed view of the invention, in partial cross-section on the axial plane taken along line III—III of FIG. 4.
Figure 4:
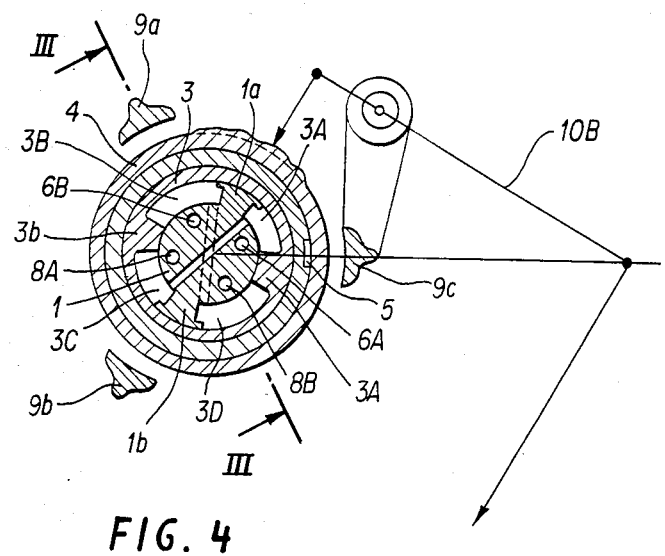
FIG. 4 is a cross-section view taken along line IV—IV of FIG. 3 and which shows an alternate embodiment of a sensor.

In the practical version of the invention which is shown in detail on FIGS. 3 and 4, are shown, with the same reference numbers as in FIGS. 1 and 2, the different parts and elements described above, with the exception of the servo-controls 7x and 7y. It has been shown, however, in FIGS. 3 and 4, three bars 9a, 9b, and 9c, the right-hand ends of which (in FIG. 3) are of one piece with a sleeve 9, to the inside of which is fixed the corresponding end of fixed axle 1. This sleeve itself is equipped, on its right end, with three tabs, such as 9A, through which pass screws, such as 11A, serving to attach the whole control mechanism to, for example, a wall 12. The left-hand ends of the three support bars 9a to 9c are also connected at the corresponding end of fixed axle 1 to a transversal piece 13. To at least one of these support bars, for example bar 9a, is attached by means of clamps 14a and 14b a sensor (10) which, in the embodiment shown, has a rod 10A mounted to slide in a radial direction, and fixed in relation to fixed axle 1, so that the end of rod 10a of sensor 10 is applied elastically against the surface of the tridimensional cam, which is formed by the external lateral surface of cylinder 4.

As shown schematically in FIG. 4, sensor 10 can, in one alternative embodiment, have a lever 10B articulated around an axle which is fixed relative to fixed axle 1; this lever is pulled back elastically so that the sensor can follow the contours of the cam.

The present invention is not limited to the embodiments described but includes all its variants. The number of radial flanges, both internal and external, on fixed axle 1 and on rotary jack 3, can be varied; each part 1 and 3 can have, for example, one flange, so as to form only 2 chambers in the rotary jack. The linear-action jack 4 can be of a simple type, as long as existing means of return are applied. Of course, at least one of the two jacks 3 and 4 can be operated using compressed air. The number and design of the various sensor such as 10 (FIG. 3) can vary as well. In the case of a sensor equipped with a sliding rod such as 10A (FIG. 3) or a lever such as 10B (FIG. 4), the sliding rod or the lever can operate on a transducer which transforms its rectilinear movements into another physical value, of an appropriate nature, for example an electrical value.

It has been supposed in the above description that the input values x and y were single-variable functions. Of course the present invention would not be essentially changed if the input values x and/or y were functions obtained from a generator of multiple-variable functions, and especially if one and/or the other input value x and y were the output of one (or several) tridimensional cams.

The control mechanism of a tridimensional cam according to the present invention can be adapted to applications other than the one described above, and, especially, all the applications of purely mechanical tridimensional cams. In particualr, it is possible for variables x, y to change over time in such a fashion that the fixed sensor "explores" the tridimensional cam following a continuous, regular trajectory, for example in a spiral or following generative functions linked by the arcs of a spiral, so that the variation over time of the output value of the sensor is representative of the sweeping of the surface of the tridimensional cam; such a mechanism could be used for example for the reproduction or copying of a complexly formed part, using either the part itself, if it is of essentially cylindrical shape, or using a cylindrical model of the part, or a flat model sufficiently supple to be applied to a rigid cylindrical surface.

What is claimed as new and desired to be secured by letters patent of the United States is:

1. A control mechanism for a tridimensional cam comprising:
   a substantially cylindrical tridimensional cam embodied by contours of an approximately cylindrical surface;
   a fixed central rod;
   a linear jack supporting said tridimensional cam and mounted on said central rod for rotational and translational movement thereon;
   a rotating jack disposed within the body of said linear jack, said rotating jack being rotatably mounted on said central rod and mounted against translation thereon, said linear jack being mounted for translation along said rotating jack, wherein said rotating jack further comprises fluid piston means for producing said translation of said linear jack;
   a key and a groove for fixing said rotating jack and said linear jack against relative rotation;
   an even number of rotary control chambers disposed between said rotating jack and said central rod, said rotary control chambers being formed in part by a plurality of radial partitions equal in number to the number of said rotary control chambers, wherein said rotary control chambers further comprise means for rotationally driving said rotating jack;
   means for supplying fluid to said fluid piston means,
   means for supplying fluid to said rotary control chambers, and
   control means for independently controlling said means for supplying fluid to said fluid piston means and said means for supplying fluid to said rotary control chambers.

2. A control mechanism as claimed in claim 1, wherein said central rod further comprises radial contact surfaces and said rotary jack further comprises end walls in contact with said radial contact surfaces, wherein said radial contact surfaces comprise means for preventing translation of said rotary jack on said central rod.

3. A control mechanism as claimed in claim 1, wherein said rotary control chambers are four in number.

4. A control mechanism as claimed in claim 1, wherein said means for supplying fluid to said fluid piston means and said means for supplying fluid to said rotary control chambers further comprise a plurality of fluid flow paths disposed within said central rod.

5. A control mechanism as claimed in claim 1, wherein said central rod passes completely through said rotating jack and linear jack and is fixed by its two ends on the surrounding stationary structure.

6. A mechanism according to claim 1, wherein said plurality of radial partitions are disposed proximate a longitudinally-central portion of said central rod, said central portion further comprising raised radial contact surfaces at first and second longitudinal boundaries of said central portion, said raised contact surfaces facing longitudinally away from said central portion, said rotating jack rotatingly contacting said central rod such that said central portion is completely disposed within said rotating jack, and wherein said rotating jack further comprises end wall means in contact with said radial contact surfaces of said central portion for preventing translation of said rotating jack on said central rod.

7. A mechanism according to claim 1, wherein said plurality of partitions forming said rotary control chambers further comprise at least one internal radial flange of said rotating jack and at least one external radial flange of said central rod, said mechanism further comprising first and second linear control chambers for actuating said fluid piston means of said linear jack.

8. A mechanism according to claim 7, further comprising a source of pressurized fluid and a drain conduit, wherein said means for supplying fluid to said fluid piston means and to said rotary control chambers further comprise a plurality of conduits formed within said control rod for connecting said rotary control chambers and said linear control chambers selectively either with said source of pressurized fluid or with said drain conduit, and wherein said rotary control chambers are each symmetric with respect to said control rod.

* * * * *